United States Patent
Lebl

(10) Patent No.: US 7,597,873 B2
(45) Date of Patent: Oct. 6, 2009

(54) PROCESS AND APPARATUS FOR THE RECOVERY OF METAL OXIDE PARTICLES

(75) Inventor: Albert Lebl, Vienna (AT)

(73) Assignee: Andritz AG, Graz (AT)

( * ) Notice: Subject to any disclaimer, the term of this patent is extended or adjusted under 35 U.S.C. 154(b) by 759 days.

(21) Appl. No.: 11/203,979

(22) Filed: Aug. 16, 2005

(65) Prior Publication Data

US 2006/0034738 A1    Feb. 16, 2006

Related U.S. Application Data

(62) Division of application No. 10/127,680, filed on Apr. 23, 2002, now Pat. No. 6,946,105.

(30) Foreign Application Priority Data

Apr. 25, 2001  (AT) .................... A 661/2001

(51) Int. Cl.
*C01B 7/00*  (2006.01)

(52) U.S. Cl. .............. 423/592.1; 423/138; 423/148; 423/488; 423/632; 423/DIG. 1; 423/DIG. 2

(58) Field of Classification Search ........... 423/138, 423/148, 488, 592.1, 632–634, 394.2, DIG. 1, 423/DIG. 2; 95/223–225, 234; 422/198, 422/173, 139–146, 182
See application file for complete search history.

(56) References Cited

U.S. PATENT DOCUMENTS

| 3,275,062 | A  | 9/1966  | Williams |
| 5,149,515 | A  | 9/1992  | Karner et al. |
| 5,939,041 | A  | 8/1999  | Lebl |
| 5,980,850 | A  | 11/1999 | Lebl |
| 6,214,310 | B1 | 4/2001  | Lebl |
| 6,451,280 | B1 | 9/2002  | Lebl |

FOREIGN PATENT DOCUMENTS

| DE | 100 06 990 A1 | 9/2000 |
| EP | 0 895 962 A1  | 2/1999 |
| WO | WO 96/27554   | 9/1996 |

OTHER PUBLICATIONS

Kladnig, et al., "Industrial oxide raw materials production according to the Andritz-Ruthner spray roasting process" Sprechsaal, vol. 124, No. 11/12, 1991, pp. 748-754.*
Translation of DE 10006990, Sep. 2000.*

\* cited by examiner

*Primary Examiner*—Steven Bos
(74) *Attorney, Agent, or Firm*—Roylance, Abrams, Berdo & Goodman, L.L.P.

(57) ABSTRACT

A process for the recovery of metal oxides from a solution containing metallic salts by spray roasting of these solutions. The process is particularly suitable for spray roasting spent pickling acids. The process feeds the solution to a reactor for spray roasting of the droplets in at least two stages, where at least one evaporation stage follows at least one conversion stage to convert the metal salts to metal oxides. The device for implementing the process includes a spray roasting reactor having a first heating zone to evaporate the water and a second heating zone to convert the metal salts to oxides.

27 Claims, 1 Drawing Sheet

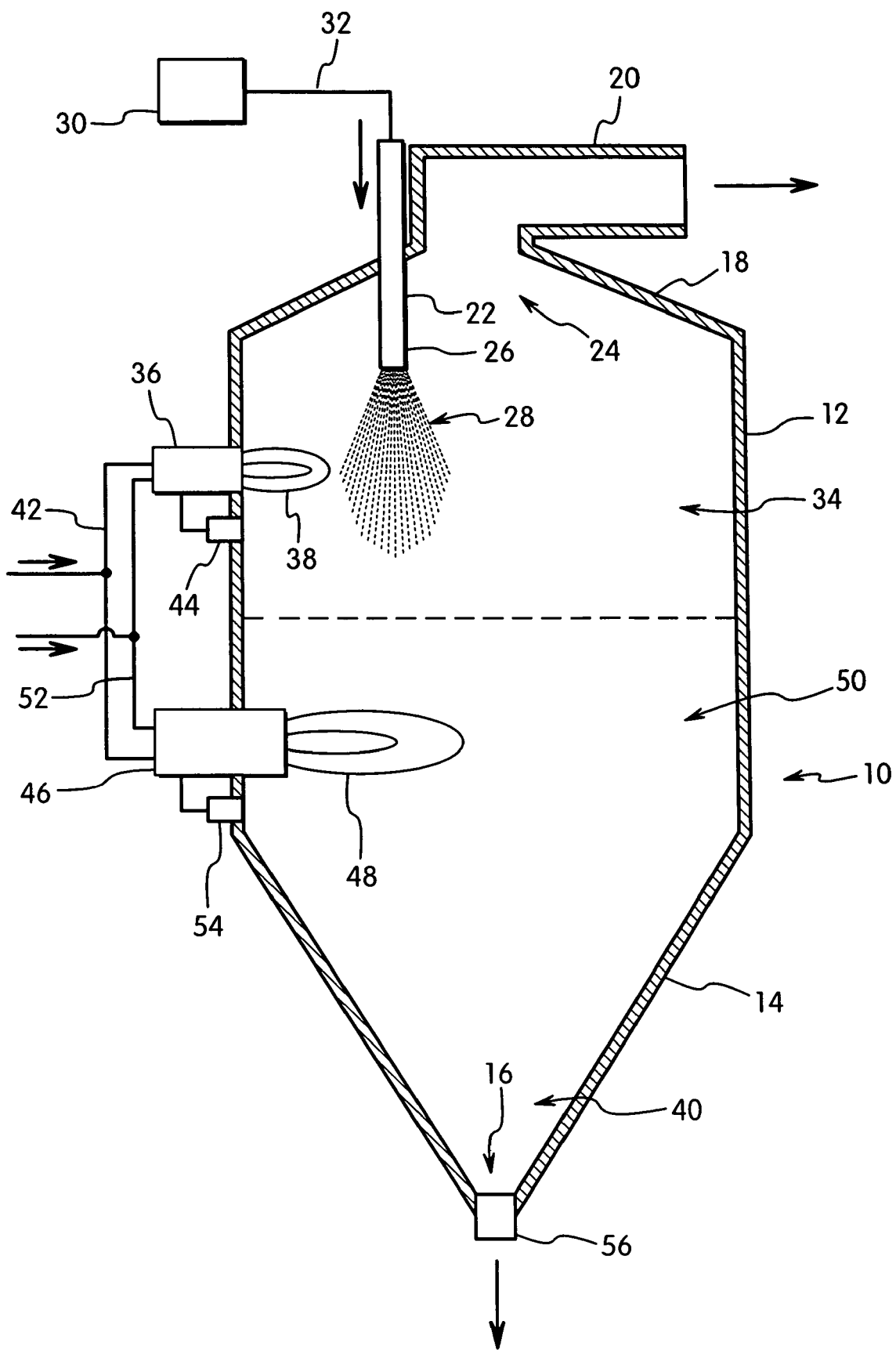

PROCESS AND APPARATUS FOR THE RECOVERY OF METAL OXIDE PARTICLES

This application is a division of Ser. No. 10/127,680, filed Apr. 23, 2002, now U.S. Pat. No. 6,946,105.

FIELD OF THE INVENTION

The present invention is directed to a process for recovering metal oxides and particularly metal oxide particles in a spray roasting reactor. The invention is also directed to a process and apparatus for regenerating spent acids containing metal salts and recovering metal oxide particles having a large surface area.

BACKGROUND OF THE INVENTION

Various solutions are obtained from industrial processes where the waste solutions contain dissolved metal salts. For example, pickling acids, such as hydrochloric and nitric acids, are commonly used in the pickling treatment of iron, stainless steel and other metals to remove scale and impurities. The resulting spent acid is often recycled and regenerated for reuse in various processes to minimize waste.

Various processes are known to recover waste acids and to extract metal oxides from aqueous solutions containing dissolved metal compounds. In one process, the waste solution is treated in a spray roasting process where the solution is fed or sprayed into a reactor and heated. The solution is sprayed into the reactor where the water and acid vapors are driven off to leave the metal salts in the reactor. The metal salts are generally carried to a secondary heating apparatus where the metal compounds are heated to convert the metal compounds to a temperature to decompose and convert the metal compounds into metal oxides. The exhaust gases from the reactor are purified by various processes. For example, the exhaust gases can be treated in a cyclone separator, cooled in a venturi washing device, and then passed through a scrubbing column.

The oxides of the prior processes are generally discharged from the bottom of the reactor by a suitable discharge device such as a rotary vane. The prior spray roasting processes provide a brief retention time in the reactor so that a certain amount of residual acid cannot be removed adequately from the metal oxide particles. As a result, the residual acid remains as an impurity in the metal oxide. When the reactor temperature is raised to completely roast the larger droplets and the droplets on the inside of the spray cone, overheating of the reactor occurs. Overheating of the reactor reduces the quality of the resulting oxide for commercial uses. In particular, the high reaction temperatures reduce the specific surface area of the resulting metal oxide particles to typically about 2.7 $m^2/g$. The low surface area of the metal oxides are usually obtained from the production of iron oxide from solutions having a high iron concentration.

Various devices and processes have been proposed to produce metal oxides of high quality. One example is disclosed in European Patent Application 0895962 which discloses the separate secondary roasting of the oxides after spray roasting. The process is primarily concerned with roasting iron containing solutions for producing iron oxide. The disclosed process is a spray roasting process with a short retention time at a relatively low temperature of approximately 500-600° C. The spray roasting process is followed by a separate secondary roasting with a much longer retention time and a lower temperature of approximately 400-500° C. Under some conditions, the low temperature secondary roasting could produce oxides having a high specific surface area. However, the long retention time for the secondary roasting limits the throughput of the plant to a relatively low level. Moreover, the long retention time of the secondary roasting step requires an expensive and complicated operating plant.

Accordingly, a continuing need exists in the industry for an improved process for treating solutions containing dissolved metal salts.

SUMMARY OF THE INVENTION

The present invention is directed to a process for recovering metal oxides from solutions containing dissolved metal salts. More specifically, the invention is directed to a process for spray roasting an aqueous solution containing dissolved metal compounds to obtain metal oxide particles having a large surface area.

Accordingly, a primary aspect of the invention is to provide a spray roasting process for treating solutions containing dissolved metal salts and recovering metal oxide particles.

Another aspect of the invention is to provide a process for recovering metal oxide particles having a large surface area from a spray roasting reactor.

Another aspect of the invention is to provide a process for recovering metal oxide particles having a large surface area from spent pickling acids and recovering and regenerating the pickling acids.

Another aspect of the invention is to provide a process and apparatus for spray roasting solutions containing a dissolved metal salt to maintain a high throughput rate suitable for a commercial plant while producing metal oxide particles having a large surface area.

Still another aspect of the invention is to provide a process and apparatus for spray roasting spent pickling acids to obtain high quality metal oxide particles.

A further aspect of the invention is to provide a process and apparatus for spray roasting spent pickling acids where the apparatus is compact and economical to construct and operate.

Another aspect of the invention is to provide a process for spray roasting a solution containing dissolved metal salts by heating droplets of the solution in an evaporation stage followed by heating substantially dry metal salts in a conversion stage to convert metal salts to metal oxides.

A still further aspect of the invention is to provide a spray roasting process for treating solutions containing dissolved metal salts where the droplets are evaporated in an evaporation stage to form metal salt particles. The metal salt particles are subsequently heated in a conversion stage at a low temperature to convert the salts to oxide particles that have a large specific surface area without requiring any protracted secondary roasting with a long retention time.

Another aspect of the invention is to provide a spray roasting reactor having at least one evaporation stage and at least one conversion stage within the same reactor chamber and immediately downstream of the evaporation stage.

A further aspect of the invention is to provide a process for treating solutions in a spray roasting reactor where the solution is heated in a first evaporation stage which is maintained at a temperature of not more than about 500° C. Maintaining the evaporation stage at this temperature results in very little conversion of the metal salts into oxides while ensuring complete or substantially complete evaporation of the liquid and vaporization of the acid.

Another aspect of the invention is to provide a process for producing high quality metal oxides and particularly iron oxides with a large specific surface area by heating metal salt particles in a conversion stage at a temperature of about 50 to 500° C. higher than the temperature in the evaporation stage.

Another aspect of the invention is to provide a spray roasting reactor having a single reactor chamber having a first energy input to define an evaporation zone and a second energy input to define a conversion zone. Preferably, the first energy input is provided at an upstream end of the reactor and the second energy input is positioned at a downstream end of the reactor.

The various aspects of the invention are basically attained by providing a process of recovering metal oxide particles from a solution containing metal salts. The solution containing the metal salts is sprayed into an upstream end of a roasting reactor to form droplets of the solution. A first heat source is supplied into the spray roasting reactor at the upstream end of the reactor to define a first heating zone. The droplets are heated to a first temperature to evaporate a substantial portion of liquid from the droplets to form substantially dry particles of metal salts. The particles of metal salts are directed to a second heating zone and a second heat source is supplied into the second heating zone of the spray roasting reactor. The second heating zone is positioned downstream of the first heating zone. The particles of metal salts are heated at a second temperature higher than the first temperature to convert the particles of metal salts to particles of metal oxides. The particles of the metal oxides are discharged from the reactor.

The aspects of the invention are also attained by providing a process for producing metal oxide particles from metal salts. An aqueous solution containing a metal salt is fed into an upstream end of a spray roasting reactor to form a spray of droplets directed toward a downstream end of the reactor. The reactor has an internal heating chamber. A first heat source is supplied into the spray of droplets in a first heating zone at the upstream end of the reactor and the droplets are heated to a first temperature in the first heating zone to evaporate a substantial portion of water from the droplets and to form substantially dry metal salt particles. The metal salt particles are directed through a second heating zone in a direction toward the downstream end and a second heat source is supplied into the second heating zone. The metal salt particles are heated to a second temperature to form metal oxide particles. The second temperature is higher than the first temperature and the second heating zone is immediately downstream of the first heating zone in the reactor. The metal oxide particles are discharged from the downstream end of the reactor.

The aspects of the invention are also attained by providing a spray roasting reactor for recovering metal oxide particles. The reactor has a chamber with an inlet end and a discharge end and a liquid supply at the inlet for feeding a solution containing metal compounds into the chamber. A first heat source is coupled to the chamber for heating the solution in a first heating zone to a first temperature to form metal salts. A second heat source is coupled to the chamber downstream of the first heating zone to heat the metal salts to a temperature to convert the metal salts to metal oxides. The second temperature is higher than the first temperature. A discharge device is provided for discharging the metal oxide particles from the second heating zone.

The various aspects, advantages and salient features of the invention will become apparent to one skilled in the art in view of the annexed drawing and the following detailed description of the invention.

BRIEF DESCRIPTION OF THE DRAWING

The following is a brief description of the drawing in which:

The FIGURE is a cross-sectional diagram of the spray roasting reactor in one embodiment of the invention.

DETAILED DESCRIPTION OF THE INVENTION

The present invention is directed to a process and apparatus for recovering metal oxide particles from a solution containing dissolved metal salts. In particular, the invention is directed to a process and apparatus for obtaining metal oxide particles having a large surface area suitable for use in various commercial processes.

The present invention is primarily directed to a process and to an apparatus for spray roasting solutions containing metal salts with a high throughput rate compared to conventional processes and still produce high quality oxides as required by the industry.

The process is particularly suitable for treating acid solutions and particularly spent pickling acid solutions containing dissolved metal salts, such as iron chloride. In the embodiments illustrated herein, the solution being treated is a spent pickling acid. In alternative embodiments, other solutions, and particularly aqueous solutions containing dissolved or solubilized metal salts, can be used in the process and apparatus of the invention. The process and apparatus are particularly suitable for large scale acid regeneration plants for recovering spent acids, regenerating the acids and generating metal oxide particles. In one preferred embodiment of the invention, a spray roasting reactor or furnace is provided for roasting the spent acids, recovering the acid vapors, and recovering the metal oxides produced during the spray roasting process. The acid vapors are recovered from the furnace and carried to further processing devices such as scrubbers and absorbers to regenerate the acids. Suitable processing devices for recovering and regenerating acids from acid vapors are those generally known in the art of regenerating waste acids. For example, a suitable apparatus for regenerating acid solutions from acid vapors is disclosed in commonly owned U.S. Pat. No. 5,149,515 to Karner, which is hereby incorporated by reference in its entirety.

The process and apparatus of the invention are particularly suitable for spent acids used in the treatment of various metals such as iron, steel and stainless steel. Examples of suitable acids include hydrochloric acid, nitric acid, hydrofluoric acid, sulfuric acid, and mixtures thereof. Spent pickling acids can contain large amounts of metal salts that are produced during the pickling process. The metal salts are preferably removed from the spent pickling acid and decomposed during the roasting process to particles of metal oxides while vaporizing the acids for regenerating the acid solution.

In preferred embodiments of the invention, the process is carried out in a spray roasting reactor having a reactor chamber. Preferably, the spray roasting reactor has a single chamber with an upstream end and a downstream end. The solution containing the dissolved or solubilized metal salts, such as a spent pickling acid, is supplied to the upstream end of the spray roasting reactor to atomize and form small droplets of the solution within the upstream end of the reactor. A first heat source is provided in the upstream end of the reactor to define an evaporation zone within the upstream end of the chamber for evaporating the liquid portion of the solution and to form substantially dry particles of the metal salt. Preferably, the evaporation zone is operated to provide a retention time for the droplets and to maintain a temperature sufficient to evaporate substantially all of the liquid phase of the solution without decomposing the metal salts in the evaporation zone. The droplet size of the solution is produced in relation to the temperature and dimensions of the evaporation zone to ensure substantially complete evaporation of the liquid and acid without the formation of metal oxides in the evaporation zone.

In a preferred embodiment, the spray roasting reactor is oriented vertically so that the upstream end and the evaporation zone are oriented on the upper end of the reactor. The particles of the metal salts fall downwardly through the reactor from the evaporation zone into a conversion zone at the lower downstream end of the reactor. Preferably, the conversion zone is oriented immediately downstream of the evaporation zone. A second heating source is provided in the conversion zone to heat the particles of the metal salts to a temperature to convert the metal salts to metal oxides. The metal oxides formed in the conversion zone fall downwardly to a discharge outlet of the reactor.

The process of the invention is able to provide a high throughput rate through a spray roasting reactor to form metal oxide particles and acid vapors which can be recovered to regenerate the acid solution. The invention is primarily directed to the discovery that by operating the spray roasting reactor to define an evaporation zone and a conversion zone within the same chamber under controlled temperatures, high quality metal oxide particles can be obtained having a high surface area. In a preferred embodiment of the invention, the solution containing the dissolved or solubilized metal salts is supplied or sprayed into the evaporation zone of the spray roasting reactor where the evaporation zone is maintained at a temperature not greater than 500° C. Typically, the evaporation zone of the spray roasting reactor is maintained at a temperature between about 350° C. and 500° C. Maintaining the temperature in the evaporation stage of the spray roasting reactor ensures that little or no metal salts are converted into oxides in the evaporation zone while substantially complete evaporation of the liquid and vaporization of the acids occurs. Preferably, the evaporation zone of the spray roasting reactor has a dimension to provide a retention time for the droplets of the solution to ensure substantially complete evaporation of the liquid and vaporization of the acid and to form substantially dry particles of the metal salts.

The conversion zone of the spray roasting reactor is provided immediately downstream of the evaporation zone and is operated at a temperature sufficient to convert the particles of metal salts to metal oxides. One aspect of the invention is directed to the discovery that controlling the temperature of the conversion zone in the spray roasting reactor enables the formation of metal oxide particles having a high surface area. In preferred embodiments of the invention, the conversion zone of the spray roasting reactor is operated at a temperature of about 50° to about 500° C. higher than the operating temperature of the evaporation zone. Typically, the conversion zone of the spray roasting reactor is operated at a temperature of about 550° C. to about 1000° C.

The process of the invention is able to treat spent acids and to produce metal oxide particles having a surface area of up to 20 m$^2$/g. Typically, the resulting metal oxide particles have a surface area of about 5 m$^2$/g to about 20 m$^2$/g. In one preferred embodiment, the resulting metal oxide particles have a surface area of about 10 m$^2$/g to about 20 m$^2$/g, and preferably 15 m$^2$/g to 20 m$^2$/g. The actual particle size and surface area of the particles can vary depending on the solution being treated and the particular metal oxide being produced. In one embodiment, the solution is a spent pickling acid containing iron salts. The acid solution can be treated by the process of the invention to produce iron oxide particles from iron chloride, where the iron oxide particles have a particle size of up to 20 m$^2$/g and preferably at least 10 m$^2$/g.

The spray roasting reactor for the process of the invention preferably includes at least two input points for supplying heat to the spray roasting reactor where the input points are spaced apart along the direction of travel of the solution and reaction products from the upstream end to the downstream end of the reactor. By separating the energy input in this manner, the energy input and the operating temperature of the evaporation zone and the conversion zone can be controlled and selectively adjusted independent from each other. Selectively controlling the temperature of the evaporation zone and the conversion zone avoids overheating in localized areas within the reactor with the resulting loss of quality of the oxides formed. Moreover, controlling the temperature of the evaporation zone and the conversion zone independently provides for complete or substantially complete evaporation of the liquid and acid vapors so that the resulting metal salt and oxide particles are substantially free of acid residues. The acid residues on the metal oxide particles are generally considered contaminants so that it is desirable to produce substantially pure metal oxide particles. The two-zone spray roasting reactor allows the operating plant to be designed in a compact manner while allowing for the conversion to metal oxides to take place quickly thereby providing the desired high throughput rate in the plant.

Referring to the FIGURE, the reactor 10 in a preferred embodiment is a spray roasting reactor having a heating chamber with a substantially cylindrical side wall 12 and a frustoconical bottom wall 14 converging toward an outlet 16 at the bottom end of reactor 10. Reactor 10 also includes a top wall 18 having an outlet 20. A spray boom 22 is positioned in the upstream end 24 of reactor 10. Boom 22 is connected to a spray nozzle 26 capable of producing an atomizing spray of the solution in the form of a spray cone 28 in reactor 10. Boom 22 is connected to a liquid supply 30 by a conduit 32 for supplying the liquid to nozzle 26. In a preferred embodiment, reactor 10 has a single heating chamber.

The upstream end 24 of reactor 10 includes a heat source or energy source for heating the upstream end 24 and to define an evaporation zone 34 in the upstream end 24 of reactor 10. Referring to the FIGURE, the heat source is a burner 36 extending through side wall 12 for directing hot combustion gases 38 directly into evaporation zone 34. Burner 36 can be positioned to direct the combustion gases radially inward toward the center of the chamber of reactor 10. Alternatively, the burner can direct the combustion gases tangentially into the chamber. Preferably, the spray cone 28 or atomizing cone of the fine droplets of the solution fed to reactor 10 is formed in a position to directly contact the hot combustion gases 38 from burner 36. Nozzle 26 is positioned to spray the fine droplets of the liquid in a direction toward the downstream end 40 of reactor 10. Preferably, nozzle 26 produces fine droplets of a particle size sufficient to enable the liquid or aqueous phase to vaporize in evaporation zone to produce substantially dry particles of the metal salts.

Burner 36 is connected to a fuel supply through a supply conduit 42. In one embodiment, a regulator 44 is provided in the evaporation zone 34 to monitor the temperature within evaporation zone 34 and to control the operation of burner 36 to maintain evaporation zone 34 within a selected temperature range.

A second energy source or heat source is provided in the downstream end 40 of reactor 10 as shown in the FIGURE. The heat source is preferably a burner 46 extending through side wall 12 for feeding hot combustion gases 48 into reactor 10 in an area defining a conversion zone 50. The combustion gases can be directed radially inward or tangentially into the chamber of reactor 10. Conversion zone 50 is oriented downstream of evaporation zone 34 and is operated at a temperature sufficient to convert the particles of metal salts formed in the evaporation zone to metal oxides as they pass toward the discharge outlet 16. In preferred embodiments, evaporation zone 34 and conversion zone 50 are contiguous within the single chamber of reactor 10 without baffles or other physical dividers between the zones.

Burner 46 is connected to a fuel supply by a supply conduit 52. A regulator 54 is provided within conversion zone 50 to monitor the temperature of conversion zone 50. Regulator 54 is operatively connected to burner 46 to operate and control burner 46 and maintain conversion zone 50 within a selected temperature range.

In one preferred embodiment, reactor 10 is operated to produce acid vapors and metal oxide particles from a spent acid solution. In one example of the invention, the solution is a spent pickling acid solution containing hydrochloric acid and dissolved or solubilized iron chloride salts. The aqueous pickling acid solution is fed from supply 30 through line 32 and boom 22 to nozzle 26. The acid is sprayed and atomized into fine droplets indicated by cone 28 directly into evaporation zone 34. Burner 36 feeds hot combustion gases 38 directly into evaporation zone 34 and into the spray cone 28 to maintain evaporation zone 34 at an operating temperature sufficient to evaporate the water and vaporize the acid. Preferably, evaporation zone 34 is maintained at a temperature not greater than 500° C. Typically, burner 36 is supplied with about a 30% or less excess air above the stoichiometric amount required for complete combustion of the fuel. Conventional spray roasting reactors generally require a high excess of air in the range of about 50% to 60%. By maintaining the evaporation zone 34 and burner 36 with a 30% excess or less, enables a reduced amount of dust being formed and discharged in the outlet of the reactor 10.

Evaporation zone 34 has a dimension to provide a retention time for the droplets of the spent acid solution to enable substantially complete evaporation of water and vaporization of the acid component. In this manner, substantially dry particles of the metal salts from the acid solution, such as iron chloride salts, are formed in evaporation zone 34. The water and acid vapors formed in evaporation zone 34 are discharged through outlet 20 and carried to a suitable acid regeneration plant.

The particles of the metal salts formed in evaporation zone 34 fall toward the downstream end 40 of reactor 10 into conversion zone 50. The particles of the metal salts pass through conversion zone 50 and are heated for a sufficient time and to a temperature sufficient to convert the metal salts to metal oxides. Typically, conversion zone 50 is operated at a temperature of about 550° C. to about 650° C., and preferably at least 50° C. higher than the temperature of evaporation zone 34. Burner 46 is preferably operated at a 30% excess or less of air that is necessary for complete combustion of the fuel. The reduced amount of air supplied to burner 46 reduces the amount of dust that is discharged from reactor 10. Conversion zone 50 has an axial dimension to provide a retention time for the particles within the conversion zone to provide substantially complete conversion of the metal salts to metal oxides.

In one embodiment of the invention, a spent acid pickling solution containing iron chloride is fed to reactor 10. The iron chloride in the acid solution is converted to iron oxide particles having a very high specific surface area of up to about 20 $m^2/g$. The two stage spray roasting process enables the high quality metal oxide particles having a high surface area to be obtained. The conversion zone 50 is operated at a higher temperature than the evaporation zone 34 to enable the evaporation of the liquid and vaporization of the acids without decomposing the metal salts in the evaporation zone 34. By providing burner 46 and conversion zone 50 in the downstream end of reactor 10, the excess heat energy from the conversion of the metal salts to metal oxides is carried upwardly through evaporation zone 34 to assist in the heating and evaporation of the spent acid solution.

Metal oxide particles and particularly iron oxide particles fall downwardly through conversion zone 50 to outlet 16. The resulting metal oxide particles are typically at a temperature of about 480° C. to about 600° C. at the time they are discharged from reactor 10. The metal oxide particles are discharged through outlet 16 by a suitable discharge device 56. Discharge device 56 can be a rotary vane or discharge rake as known in the art. The exhaust gas containing water vapor and acid vapors is discharged through outlet 20 at a temperature of about 380° C. to about 450° C. The exhaust gas is preferably carried to a cyclone for secondary cleaning, a venturi washer for cooling, and then to a suitable adsorption column to rinse and regenerate the acids. Iron chloride ($FeCl_3$) sublimates at 305° C. and begins to decompose at about 324° C., thereby causing iron oxide ($Fe_2O_3$) aerosol to form. The iron chloride has a catalytic effect on chlorine formation in the reactor. The reduced formation of iron chloride in the exhaust gas leads to less chlorine being formed in the reactor. The chlorine remains in the reactor due to the reduced dust transfer to the acid regeneration plant.

The reactor 10 in the illustrated embodiment is oriented vertically so that the spent acid solution is introduced in a generally downward direction from the top end toward the bottom end of the reactor. Thus, the droplets of the acid solution are formed in the conversion zone and evaporate to form particles of metal salts which are then directed downwardly through the conversion zone. By providing two heat sources such as burners 46 and 36 at different levels within reactor 10, metal oxide particles can be obtained having a desired surface area and quality. Preferably, the heat source for the evaporation zone and the conversion zone are spaced apart in a vertical direction and in a direction from the upstream end to the downstream end of the reactor. The reactor of the invention provides an efficient process for regenerating acids and recovering metal oxide particles. The apparatus provides for a greater than 20% reduction in the dimension of the venturi washer, acid absorption columns, exhaust gas scrubber, and the exhaust gas fan due in part to the reduced formation of dust particles and the amount of dust particles carried from the reactor in the exhaust gas.

The process and apparatus as described herein are particularly suitable for treating spent pickling acid solutions containing iron chloride to recover iron oxide particles. The operating temperatures of the furnace as described herein are particularly suitable for converting iron chloride to iron oxide. The actual operating temperature of reactor 10 will vary depending on the particular metal salt contained in the solution being supplied to the reactor. The surface area of the resulting metal oxide particles can also vary depending on the particular metal. The temperature and feed rate of the solution can be selected for the evaporation and conversion zone according to the desired properties of the resulting metal oxide particles.

While various embodiments have been chosen to illustrate the invention, it will be appreciated the various changes and modifications can be made without departing from the scope of the invention as defined in the appended claims.

What is claimed is:

1. A process of recovering metal oxide particles from a solution containing metal salts, said process comprising the steps of:
   spraying said solution containing said metal salts into an upstream end of a spray roasting reactor to form droplets of said solution, said spray roasting reactor having a single heating chamber with an upper portion at said upstream end defining a first heating zone and a lower portion defining a second heating zone;
   supplying a first heat source into said spray roasting reactor to said a first heating zone, and heating said droplets in said first heating zone to a first temperature to evaporate a substantial portion of liquid from said droplets to form substantially dry particles of metal salts;
   directing said particles of metal salts to said second heating zone and supplying a second heat source into said second heating zone of said heating chamber, said second heating zone being positioned below and downstream of said first heating zone whereby said particles of metal salts fall directly from said first heating zone through said second heating zone, and heating said particles of metal salts at a second temperature higher than said first temperature to convert said particles of metal salts to particles of metal oxides; and
   discharging said particles of said metal oxides from said heating chamber.

2. The process of claim 1, said process including the step of spraying said solution directly into said first heating zone.

3. The process of claim 2, comprising spraying said solution in a substantially downward direction to pass through said first heating zone toward said second heating zone.

4. The process of claim 1, wherein said first heating source is supplied to said first heating zone at said upstream end of said spray roasting reactor and said second heat source is supplied to said second heating zone below said first heating zone.

5. The process of claim 1, comprising heating said droplets in said first heating zone to a temperature not more than 500° C. for a time sufficient to form said metal salt particles substantially without decomposing said metal salt particles in said first heating zone.

6. The process of claim 5, comprising heating said droplets in said first heating zone to a temperature of about 350° C. to about 500° C.

7. The process of claim 5, further comprising heating said metal salt particles in said second heating zone at a temperature of at least 50° C. higher than said first temperature.

8. The process of claim 5, comprising heating said metal salt particles in said second heating zone to a temperature of about 50° C. to about 500° C. higher than said first temperature.

9. The process of claim 5, comprising the step of heating said metal salt particles to a temperature of about 500° C. to about 1000° C. in said second heating zone.

10. The process of claim 1, wherein said metal oxide particles have a specific surface area of about 10 m²/g to about 20 m²/g.

11. The process of claim 1, wherein said metal oxide particles have a specific surface area of about 15 m²/g to about 20 m²/g.

12. The process of claim 1, comprising the step of heating said metal salt particles in said second heating zone to a temperature of about 550° C. to about 650° C.

13. The process of claim 1, wherein said heating chamber has a side wall extending between said first heating zone and said second heating zone, and wherein said first heating zone is formed in an upper end of said reactor and said second heating zone is formed at a lower end of said reactor.

14. The process of claim 13, wherein said heating chamber includes an exhaust gas outlet at said upper end for discharging exhaust gases from said first heat source and said second heat source.

15. The process of claim 13, wherein said second heating zone is directly below said first heating zone whereby said metal salts formed in said first heating zone fall directly from said first heating zone through said second heating zone to said discharge end.

16. The process of claim 1, wherein said solution is a spent pickling acid.

17. A process for producing metal oxide particles from metal salts, said process comprising the steps of:
   feeding an aqueous solution containing a metal salt into an upstream end of a spray roasting reactor to form a spray of droplets directed toward a downstream end of said spray roasting reactor, said spray roasting reactor having a top wall, a bottom wall and a side wall an internal heating chamber with an upper portion defining a first heating zone and a lower portion defining a second heating zone;
   supplying a first heat source into said spray of droplets in said first heating zone at said upper portion of said internal heating chamber and heating said droplets to a first temperature in said first heating zone to evaporate a substantial portion of water from said droplets and to form substantially dry metal salt particles;
   directing said metal salt particles downwardly through the second heating zone in a direction toward said downstream end and supplying a second heat source into said second heating zone and heating said metal salt particles to a second temperature to form metal oxide particles, where said second temperature is higher than said first temperature and where said second heating zone is immediately downstream of said first heating zone in said reactor; and
   discharging said metal oxide particles from said downstream end of said internal heating chamber of said reactor.

18. The process of claim 17, wherein said solution is a spent pickling acid solution, and wherein said process comprises heating said droplets in said first heating zone to produce acid vapors and water vapor, withdrawing said acid vapors and water vapor from said first heating zone, and regenerating an acid solution from said acid vapors.

19. The process of claim 17, wherein said spray roasting reactor comprises a single heating chamber, said process comprising spraying said solution in a downward direction directly into said first heating zone toward said second heating zone.

20. The process of claim 17, wherein said first heat source comprises a first burner for producing hot combustion gases, and said second heat source comprises a second burner for producing hot combustion gases, said process comprising feeding said hot combustion gases into said first heating zone at a rate to heat said first heating zone to said first temperature, and feeding said hot combustion gases from said second burner into said second heating zone at a rate to heat said second heating zone to said second temperature.

21. The process of claim 17, comprising heating said droplets in said first heating zone to a temperature of not more than 500° C. for a time sufficient to form said metal salt particles substantially without decomposing said metal salt particles.

22. The process of claim 21, comprising heating said droplets in said first heating zone to a temperature of about 350° C. to about 500° C.

23. The process of claim 21, comprising heating said metal salt particles in said second heating zone to a temperature of about 50° C. to 500° C. higher than said first temperature.

24. The process of claim 21, comprising heating said metal salt particles in said second heating zone to a temperature of about 550° C. to about 650° C.

25. The process of claim 17, wherein said metal oxide particles have a surface area of about 15 $m^2/g$ to about 20 $m^2/g$.

26. The process of claim 18, comprising withdrawing said acid vapors from said first heating zone at a temperature of about 380° C. to about 450° C.

27. The process of claim 17, wherein said side wall of said spray roasting reactor extends between said first heating zone and said second heating zone, said process comprising spraying said solution in a downward direction whereby said metal salt particles fall from said first heating zone directly to said second heating zone.

* * * * *